(12) United States Patent
Kowalski et al.

(10) Patent No.: US 10,690,219 B2
(45) Date of Patent: Jun. 23, 2020

(54) REDUCED NOISE FLEXPLATE

(71) Applicant: MAGNA POWERTRAIN, INC., Conford (CA)

(72) Inventors: Andrzej Kowalski, Toronto (CA); Gunter R. Ladewig, Maple (CA); Georges Issa, Richmond Hill (CA); Dusan Milacic, Toronto (CA)

(73) Assignee: MAGNA POWERTRAIN, INC., Concord, Ontario (CA)

( * ) Notice: Subject to any disclaimer, the term of this patent is extended or adjusted under 35 U.S.C. 154(b) by 26 days.

(21) Appl. No.: 16/112,931

(22) Filed: Aug. 27, 2018

(65) Prior Publication Data
US 2018/0363726 A1 Dec. 20, 2018

Related U.S. Application Data

(63) Continuation of application No. 14/820,625, filed on Aug. 7, 2015, now Pat. No. 10,060,503.

(Continued)

(51) Int. Cl.
*F16F 15/129* (2006.01)
*F02N 15/02* (2006.01)
(Continued)

(52) U.S. Cl.
CPC ............ *F16F 15/129* (2013.01); *B60K 17/00* (2013.01); *F02N 15/02* (2013.01); *F16D 1/00* (2013.01); *F16D 3/14* (2013.01); *F16D 3/72* (2013.01); *F16D 3/77* (2013.01); *F16D 65/0006* (2013.01); *F16F 15/10* (2013.01); *F16F 15/30* (2013.01); *F16H 55/14* (2013.01); *F02N 11/0814* (2013.01); *F16D 1/068* (2013.01);

(Continued)

(58) Field of Classification Search
CPC .............................. F16F 15/129; B60K 17/00
See application file for complete search history.

(56) References Cited

U.S. PATENT DOCUMENTS

| 2,346,732 A | 4/1944 | Crawford et al. |
| 4,318,283 A | 3/1982 | Windish |

(Continued)

FOREIGN PATENT DOCUMENTS

| CN | 101595326 A | 12/2009 |
| FR | 2822907 A1 | 10/2002 |

OTHER PUBLICATIONS

"Introduction to Tog-L-Log®; An overview of BTM's Tog-L-Loc® sheet metal clinching system", BTM Corporation, http://www.BTMcorp.com, 738864CA.

(Continued)

*Primary Examiner* — Terence Boes
(74) *Attorney, Agent, or Firm* — Dickinson Wright PLLC

(57) ABSTRACT

A flexplate assembly comprising a central plate having a general disc shape disposed about and extending radially from an axis. The central plate has a first radial width. A ring gear is annularly secured about the central plate and presents an outer circumference that defines a plurality of ring teeth extending therefrom. At least one noise plate is disposed adjacent to the central plate and extends circumferentially about the axis for reducing vibrations and noise from the flexplate assembly. The noise plate has a second radial width that is at least one half of the first radial width of the central plate. A method of constructing such a flexplate assembly is also provided.

22 Claims, 20 Drawing Sheets

Related U.S. Application Data

(60) Provisional application No. 62/046,019, filed on Sep. 4, 2014, provisional application No. 62/046,454, filed on Sep. 5, 2014.

(51) Int. Cl.

| | |
|---|---|
| *F16H 55/14* | (2006.01) |
| *F16F 15/10* | (2006.01) |
| *F16D 1/068* | (2006.01) |
| *F16D 1/072* | (2006.01) |
| *F16D 1/076* | (2006.01) |
| *F16D 1/00* | (2006.01) |
| *F16D 3/14* | (2006.01) |
| *F16D 3/77* | (2006.01) |
| *F16D 65/00* | (2006.01) |
| *F16F 15/30* | (2006.01) |
| *B60K 17/00* | (2006.01) |
| *F16D 3/72* | (2006.01) |
| *F02N 11/00* | (2006.01) |
| *F02N 11/08* | (2006.01) |

(52) U.S. Cl.
CPC .............. *F16D 1/072* (2013.01); *F16D 1/076* (2013.01); *F16D 2300/22* (2013.01); *F16F 2222/04* (2013.01); *Y02T 10/6204* (2013.01)

(56) References Cited

U.S. PATENT DOCUMENTS

| | | |
|---|---|---|
| 5,323,665 A | 6/1994 | Rediker, Jr. |
| 5,695,034 A | 12/1997 | Graton et al. |
| 6,352,384 B1 | 3/2002 | Frisch et al. |
| 7,219,578 B2 | 5/2007 | Hada et al. |
| 8,590,683 B2 | 11/2013 | Tsukamoto et al. |
| 2007/0277643 A1 | 12/2007 | King et al. |
| 2011/0031058 A1 | 2/2011 | Klotz et al. |
| 2014/0157929 A1 | 6/2014 | Yin |

OTHER PUBLICATIONS

Extended European Search Report dated Apr. 26, 2016 from corresponding European patent application Serial No. 15182006.5.

REDUCED NOISE FLEXPLATE

CROSS REFERENCE TO RELATED APPLICATIONS

This application is a continuation of U.S. patent application Ser. No. 14/820,625 filed on Aug. 7, 2015 which claims the benefit of and priority to U.S. Provisional Application No. 62/046,019, filed Sep. 4, 2014 and U.S. Provisional Application No. 62/046,454, filed Sep. 5, 2014, the entire disclosures of which are incorporated herein by reference.

FIELD

The present disclosure relates generally to a flexplate assembly for use with a powertrain in a motor vehicle.

BACKGROUND

This section provides background information related to the present disclosure which is not necessarily prior art.

A flywheel, or flexplate, is a known component in automobiles. As appreciated, the flexplate operates as a mechanical coupling between crankshaft (i.e. output) of an engine and a torque convertor of a transmission. Consequently, the flexplate transmits torque to the transmission. Additionally, the flexplate serves as an engagement point for a pinion gear of an electric starter motor. When the electric starter motor receives an electrical current in response to an ignition signal from the vehicle, the pinion gear engages and drives a ring gear portion of the flexplate, thereby causing the flexplate to rotatably drive the engine crankshaft. Upon the engine being successfully started, the pinion gear is disengaged while the flexplate continues to be rotatably driven by the crankshaft.

The starter's pinion gear generally impacts, both axially and radially, the flexplate during starting of automobiles, which can thereby cause noise which can be unpleasant to passengers in the automobile. With the increased frequency of starting modern automobiles (e.g. stop-start technology), noise reduction during starting is becoming increasingly important. Accordingly, there is a growing need for flexplate assemblies with improved noise reduction.

SUMMARY

This section provides a general summary of the present disclosure and is not intended to be interpreted as a comprehensive disclosure of its full scope or all of its features, aspects and objectives.

Accordingly, it is an aspect of the present disclosure to provide a flexplate assembly comprising a central plate having a general disc shape disposed about and extending radially from an axis. The central plate has a first radial width. A ring gear is annularly secured about the central plate and presents an outer circumference that defines a plurality of ring teeth extending therefrom. At least one noise plate is disposed adjacent to the central plate and extends circumferentially about the axis for reducing vibrations and noise from the flexplate assembly. The noise plate has a second radial width that is at least one half of the first radial width of the central plate.

It is another aspect of the present disclosure to provide a method of constructing a flexplate assembly including forming a central plate disposed about and extending radially from an axis and having a first radial width. A ring gear is formed about the central plate. At least one noise plate is formed. The noise plate extends circumferentially about the axis and has a second radial width that is at least one half of the first radial width of the central plate. The noise plate is attached to the central plate and ring gear such that the central plate overlies the noise plate.

These and other aspects and areas of applicability will become apparent from the detailed written description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

DETAILED DESCRIPTION

Figure 1:
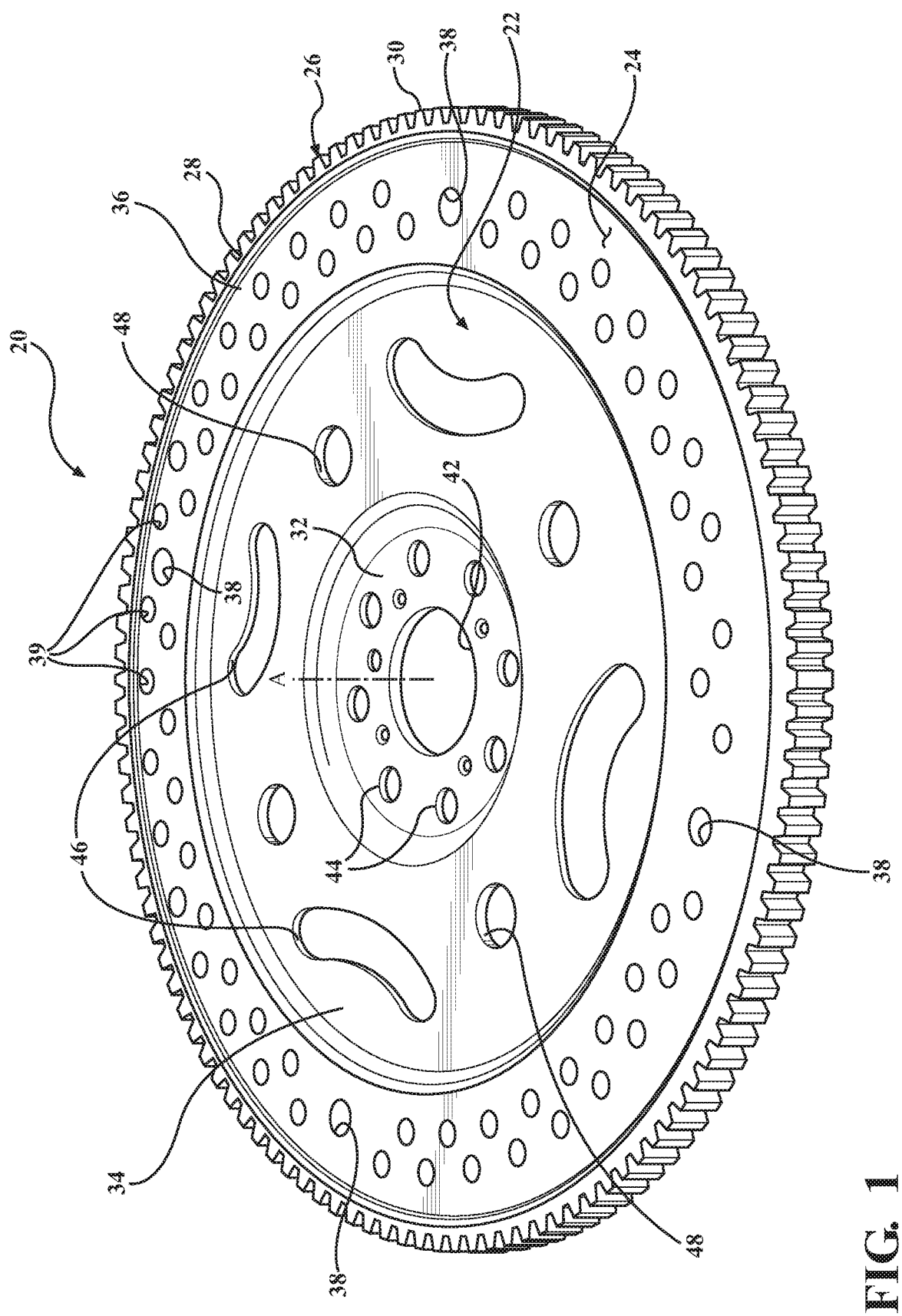
FIG. 1 is a perspective view of a flexplate assembly illustrating a central plate and a ring gear according to an aspect of the disclosure.

In the following description, details are set forth to provide an understanding of the present disclosure. In some instances, certain structures and techniques have not been described or shown in detail in order not to obscure the disclosure.

In general, the present disclosure relates to flexplate assemblies used for conveying rotational energy in various power operated devices of the type well-suited for use in many applications. The flexplate assembly of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring to the Figures, wherein like numerals indicate corresponding parts throughout the several views, a flexplate assembly 20, 120 for use with a powertrain in a motor vehicle is generally shown. The flexplate assembly 20, 120 includes a central plate 22 that has a generally disc shape that is disposed about and extends radially from an axis A and presents a top surface 23 and a bottom surface 24. A ring gear 26 is disposed annularly about the central plate 22 and presents an outer circumference 28. The outer circumference 28 of the ring gear 26 presents a plurality of ring teeth 30 that extend radially therefrom for engaging pinion teeth of a pinion gear (not shown) coupled to a starter of an automobile to rotate the flexplate assembly 20, 120.

According to an aspect of the disclosure, the central plate 22 extends radially from the axis A from an inner portion 32, to an intermediate portion 34, to an outer portion 36, as best shown in FIG. 1. The inner portion 32 has a generally hemispherical cross-sectional shape. The intermediate portion 34 is stepped axially from the inner and outer portions 32, 36. The outer portion 36 defines a plurality of mounting apertures 38 circumferentially and evenly spaced from one another about the outer portion 36 for receiving a plurality of first mounting bolts (not shown) for securing the flexplate assembly 20 to a torque convertor (not shown). The outer portion 36 may also define secondary apertures 39 for reducing the weight of the central plate 22. According to an aspect, an insert 40 (FIGS. 8B and 9A) may also be disposed in each mounting aperture 38 to provide a more secure attachment between the flexplate assembly 20 and the torque convertor.

Figure 3:
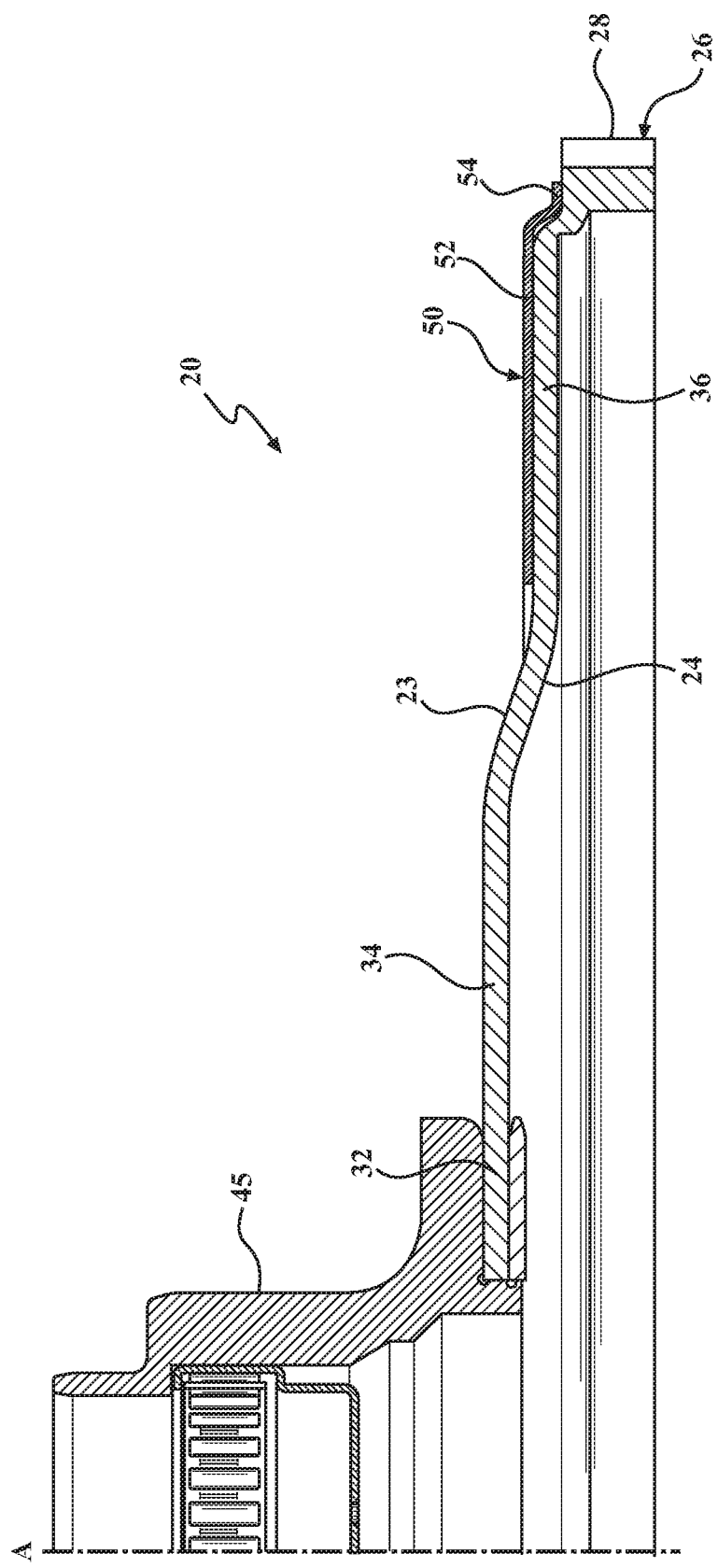
FIG. 3 is a partial side cross-sectional view of a flexplate assembly illustrating a noise plate according to an aspect of the disclosure.
Figure 4:
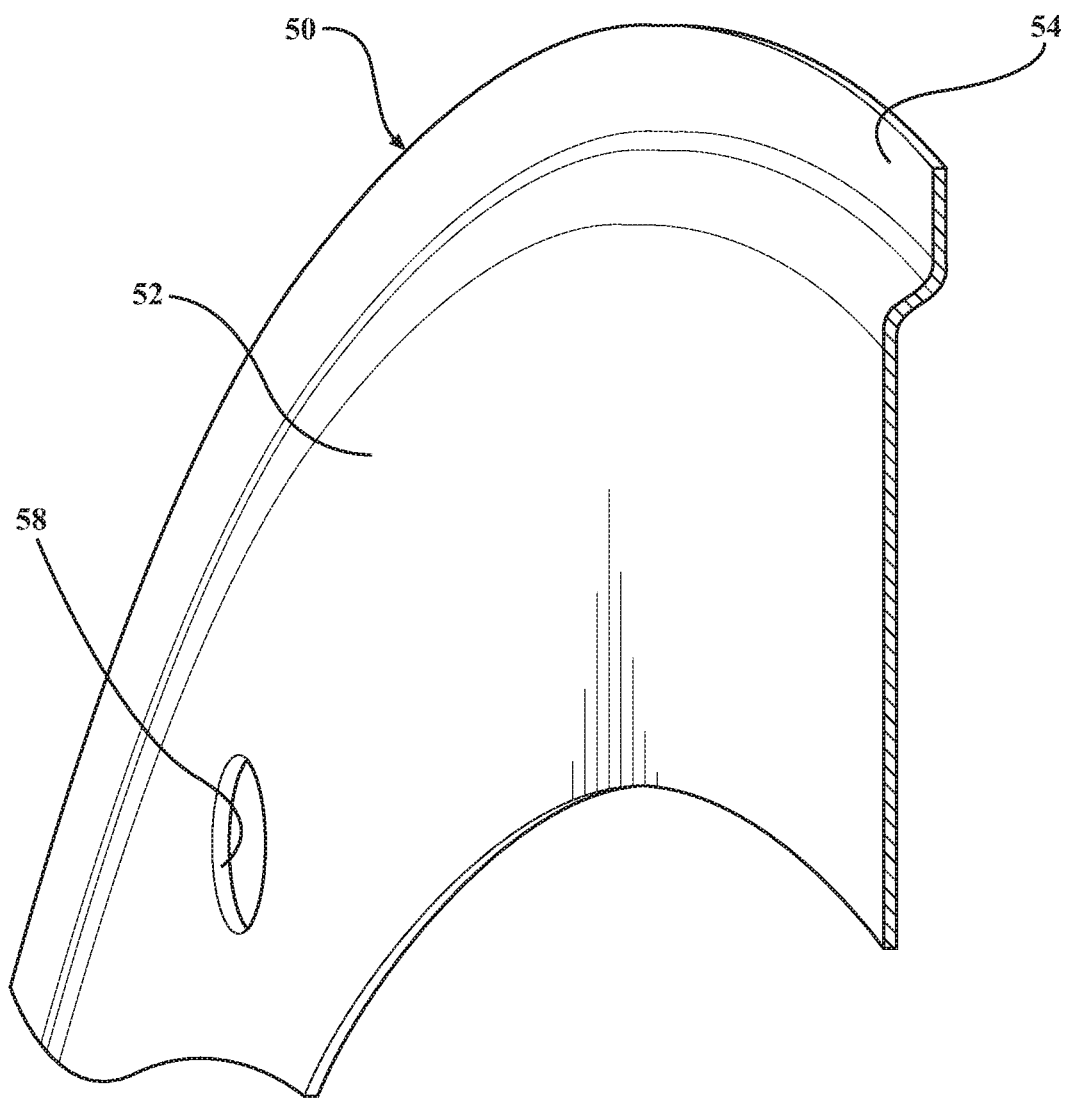
FIG. 4 is a partial perspective cross-sectional view of the noise plate shown in FIG. 3.
Figure 5:
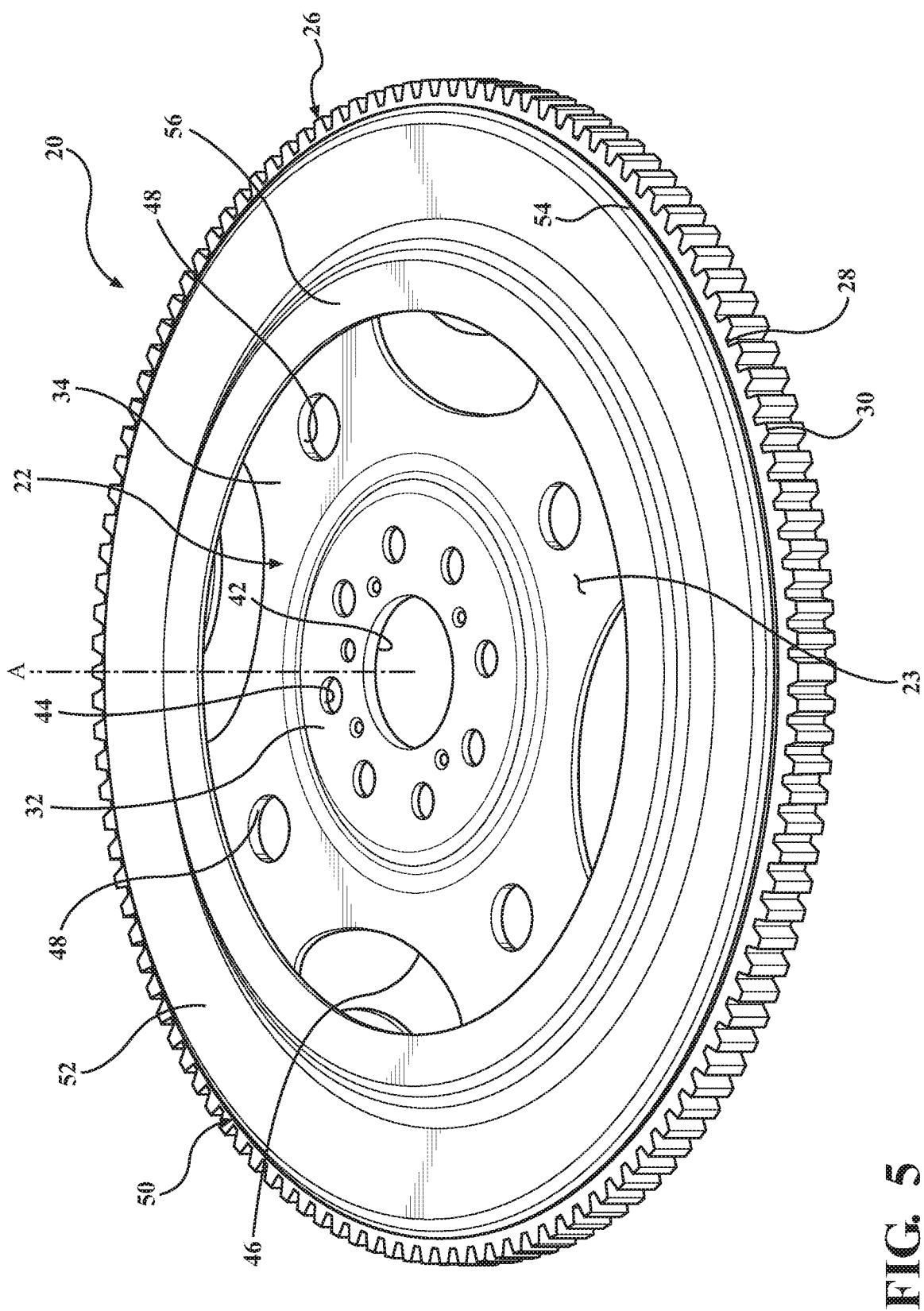
FIG. 5 is a perspective view of a flexplate assembly illustrating a central plate, a ring gear, and a noise plate according to an aspect of the disclosure.
Figure 6:
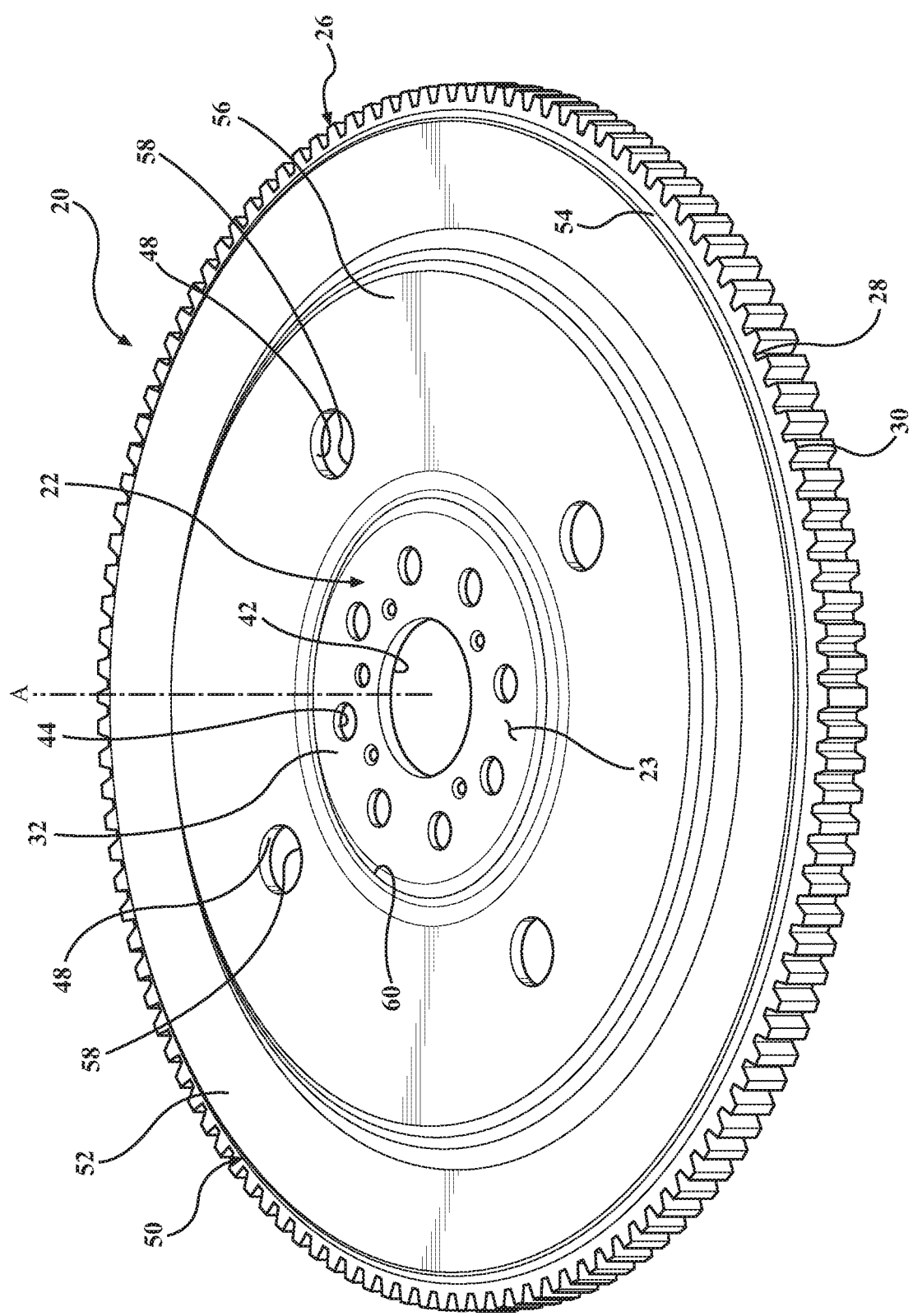
FIG. 6 is a perspective view of a flexplate assembly illustrating a central plate, a ring gear, and a noise plate according to an aspect of the disclosure.
Figure 7:
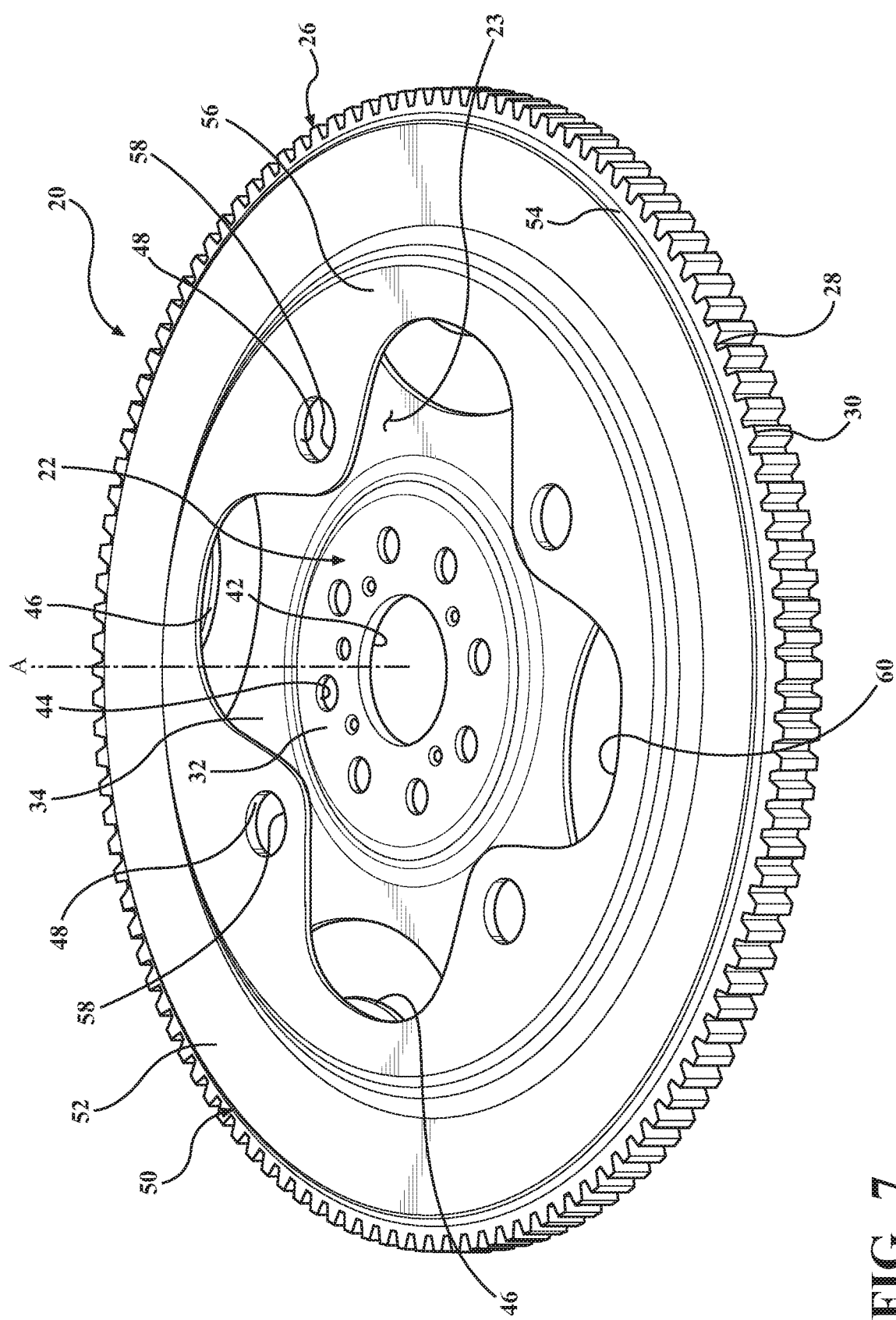
FIG. 7 is a perspective view of a flexplate assembly illustrating a central plate, a ring gear, and a noise plate according to an aspect of the disclosure.

The inner portion 32 defines a central opening 42 extending through the central plate 22 along the axis A for receiving and securing the flexplate assembly 20 to a crankshaft (not shown). The inner portion 32 of the central plate 22 defines a plurality of attaching apertures 44 circumferentially and evenly spaced from one another about the inner portion 32 for receiving a plurality of second mounting bolts for securing the flexplate assembly 20 to a hub 45 (FIG. 3) of the crankshaft.

The intermediate portion 34 of the central plate 22 defines a plurality of first slots 46 that have a kidney shape and are circumferentially and evenly spaced about the intermediate portion 34 for providing for flexibility and reduced weight of the central plate 22. The intermediate portion 34 of the central plate 22 further defines a plurality of second slots 48 that have a circular shape and are circumferentially and evenly spaced about the intermediate portion 34 for also providing for reduced weight of the central plate 22. It should be appreciated that more or fewer apertures 38, 39, 44, and slots 46, 48 of various sizes and shapes could be defined by the central plate 22 to accommodate for other configurations of the central plate 22.

As best shown in FIGS. 2-11, the flexplate assembly 20 further includes a noise plate 50 that is disposed adjacent to the central plate 22 and extends circumferentially about the axis A for reducing vibrations and noise from the flexplate assembly 20. While vibrations and noise from the flexplate assembly 20 may primarily occur for example during starting of the automobile when the pinion gears of the starter of the automobile impact the ring teeth 30 of the ring gear 26 of the flexplate assembly 20, it should be understood that the noise plate 50 may reduce vibrations and noise at other times. In the disclosed embodiments, the noise plate 50 is made of a steel material but it should be appreciated that the noise plate 50 could be made of other materials such as, but not limited to, aluminum or plastics. In the disclosed embodiments, the noise plate 50 is frictionally engaged with and slideably moveable relative to the central plate 22 and/or ring gear 26 to reduce noise and reduce vibrations during starting of the automobile by converting friction into heat. In other words, the noise plate 50 is frictionally engaged with the central plate and/or ring gear 26 for permitting limited sliding movement of the noise plate 50 relative to the central plate 22 and/or ring gear 26. The noise plate 50 and central plate 22 and/or ring gear 26 may move relative to one another in radial, axial, and/or angular directions depending on the design of the central plate 22 and noise plate 50.

According to an aspect of the disclosure, the noise plate 50 could be constructed in various shapes and configurations. In embodiments shown in FIGS. 2-4, the noise plate 50 generally has a ring shape and includes a flange 52 and a lower lip 54 extending generally axially and radially outwardly from the flange 52 to a maximum deflection zone adjacent to the ring teeth 30 of the ring gear 26. It should be appreciated that the noise plate 50 could also extend between the ring gear 26 and the central plate 22. In further embodiments best shown in FIGS. 5-7, the noise plate 50 also includes an upper lip/angled portion 56 that extends generally axially away from and radially inwardly from the flange 52 toward the axis A (i.e. crankshaft centerline). By extending the noise plate 50 into the maximum deflection zone and/or inwardly toward the axis A, the effective noise plate-to-central plate sliding interface or surface area may be increased which consequently provides for maximum noise reduction by conversion of friction to heat. Additionally, noise plate 50 may define a plurality of apertures 58 extending through the noise plate 50. According to an aspect, the upper lip 56 defines a middle opening 60 about the axis A. In the embodiment disclosed in FIG. 6, the upper lip 56 defines apertures 58 which are aligned with the upper slots 48 of the central plate 22. Additionally, in the embodiment of FIG. 7, the middle opening 60 has a general cross shape.

It should be appreciated that the flange 52, lower lip 54, and upper lip 56 of the noise plate 50 could have various shapes and sizes to increase relative sliding between the noise plate 50 and central plate 22 and/or ring gear 26 to provide for increased reduction of noise and vibrations through increased conversion of friction to heat. Additionally, it should be appreciated that the noise plate 50 could engage to the central plate 22 and/or ring gear 26 with or without tabs (i.e. fingers). According to an aspect, the tabs could extend from the noise plate 50 toward the periphery of the central plate 22 or ring gear 26 to provide spring-like compressive forces on the ring gear 26 for increased friction to heat conversion and to provide for additional impact cushioning and compliance. According to another aspect, the noise plate 50 may also be preshaped, whereby its periphery or tabs provide spring-like compressive force on the central plate 22 or ring gear 26 once assembled with the central plate 22 and the ring gear 26. The perimeter of the flexplate assembly 20, 120 may additionally be frequency "tuned" using the tabs or without the use of tabs. Although the noise plate 50 may primarily engage the central plate 22 at its periphery, according to an aspect, it could fully or partially engage it at other locations. Additionally, a surface treatment, texture, or coating may be applied to regions of or the entire noise plate 50, central plate 22, and/or ring gear 26 in order to alter the friction coefficient between the noise plate 50, the central plate 22, and/or the ring gear 26. Furthermore, while the noise plate 50 can be disposed adjacent to the top surface 23 of the central plate 22 (FIGS. 2-7), it should be appreciated that the noise plate 50 could be positioned adjacent to the bottom surface 24, as illustrated in FIGS. 8A-8C.

Figure 8A:
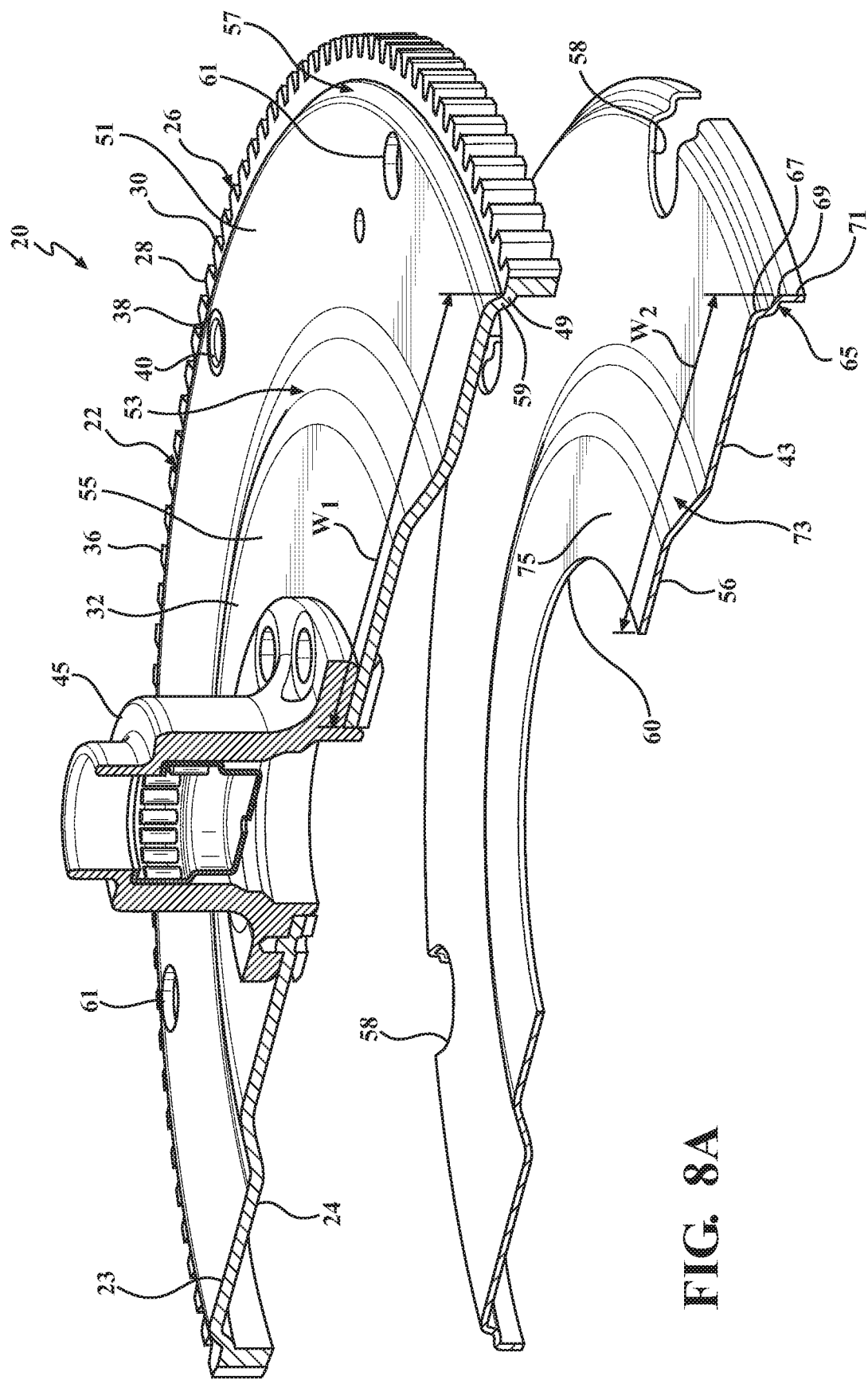
FIG. 8A is an exploded cross-sectional view of a flexplate assembly according to an aspect of the disclosure.
Figure 8B:
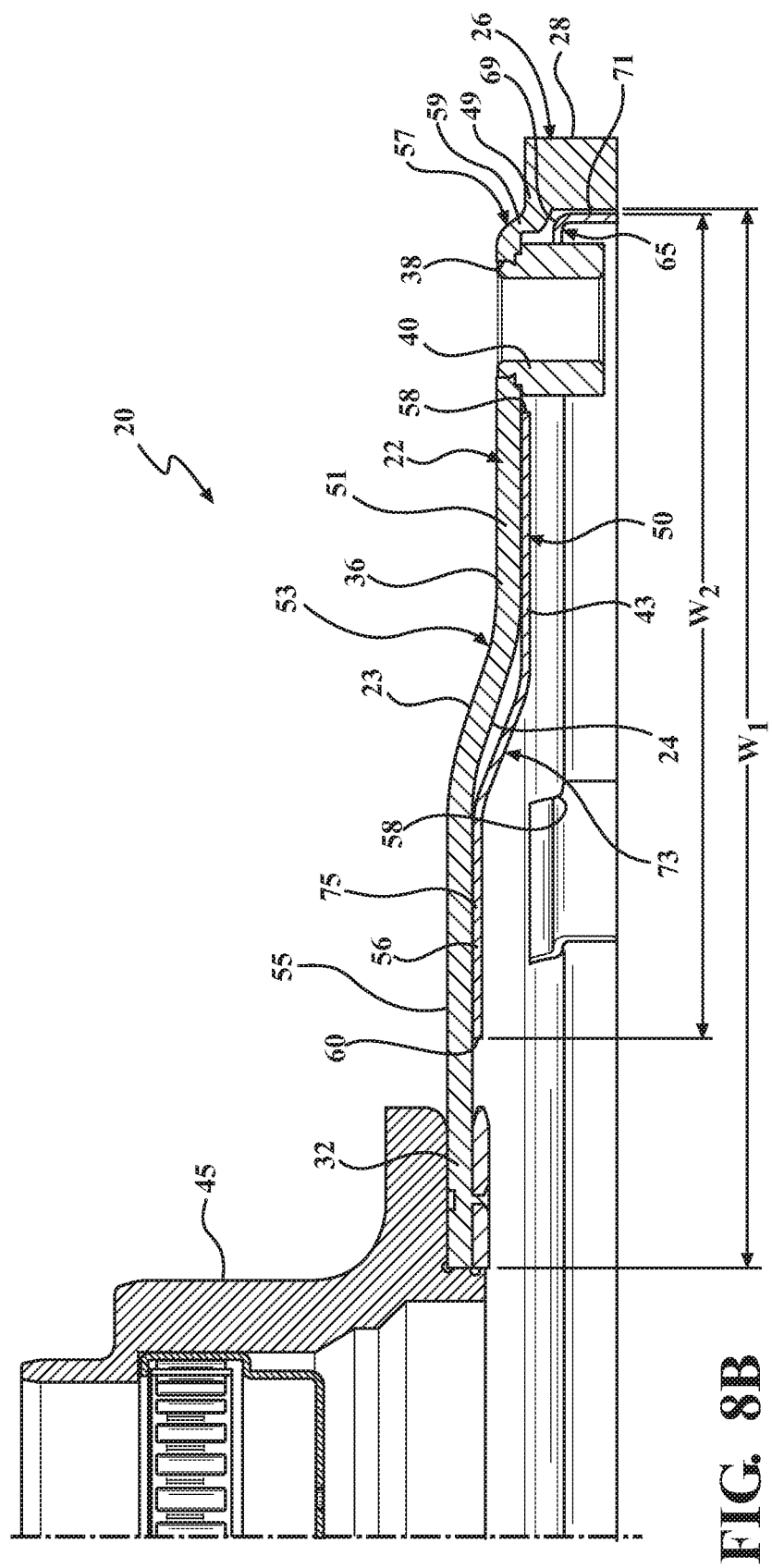
FIG. 8B is a partial side cross-sectional view of the flexplate assembly shown in FIG. 8A.
Figure 8C:
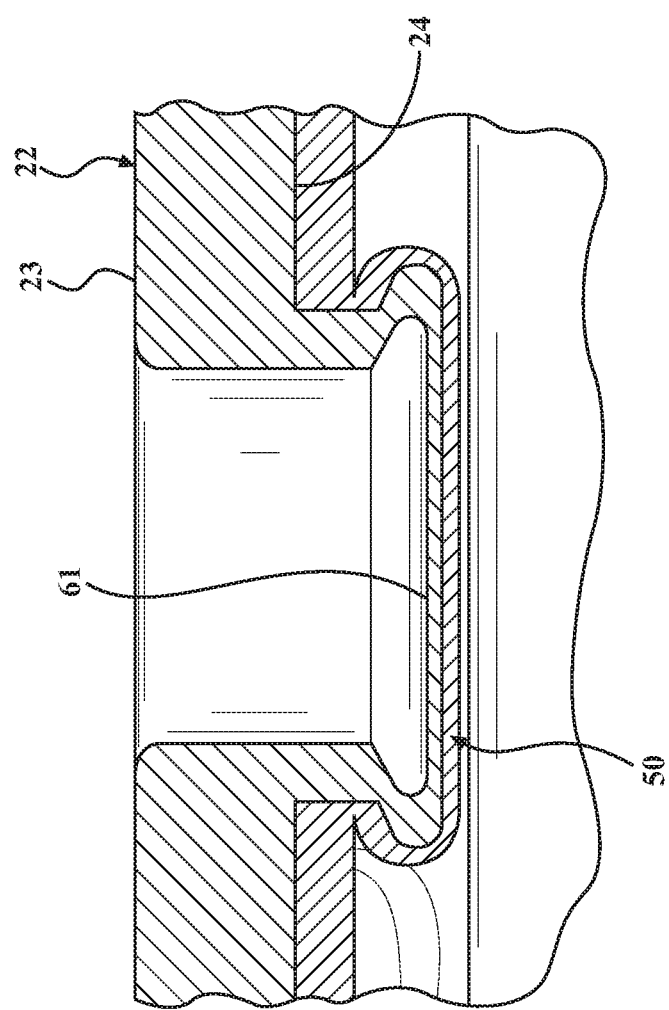
FIG. 8C is an enlarged partial cross-sectional view of the flexplate assembly shown in FIG. 8A illustrating a plate fastener.
Figure 9:
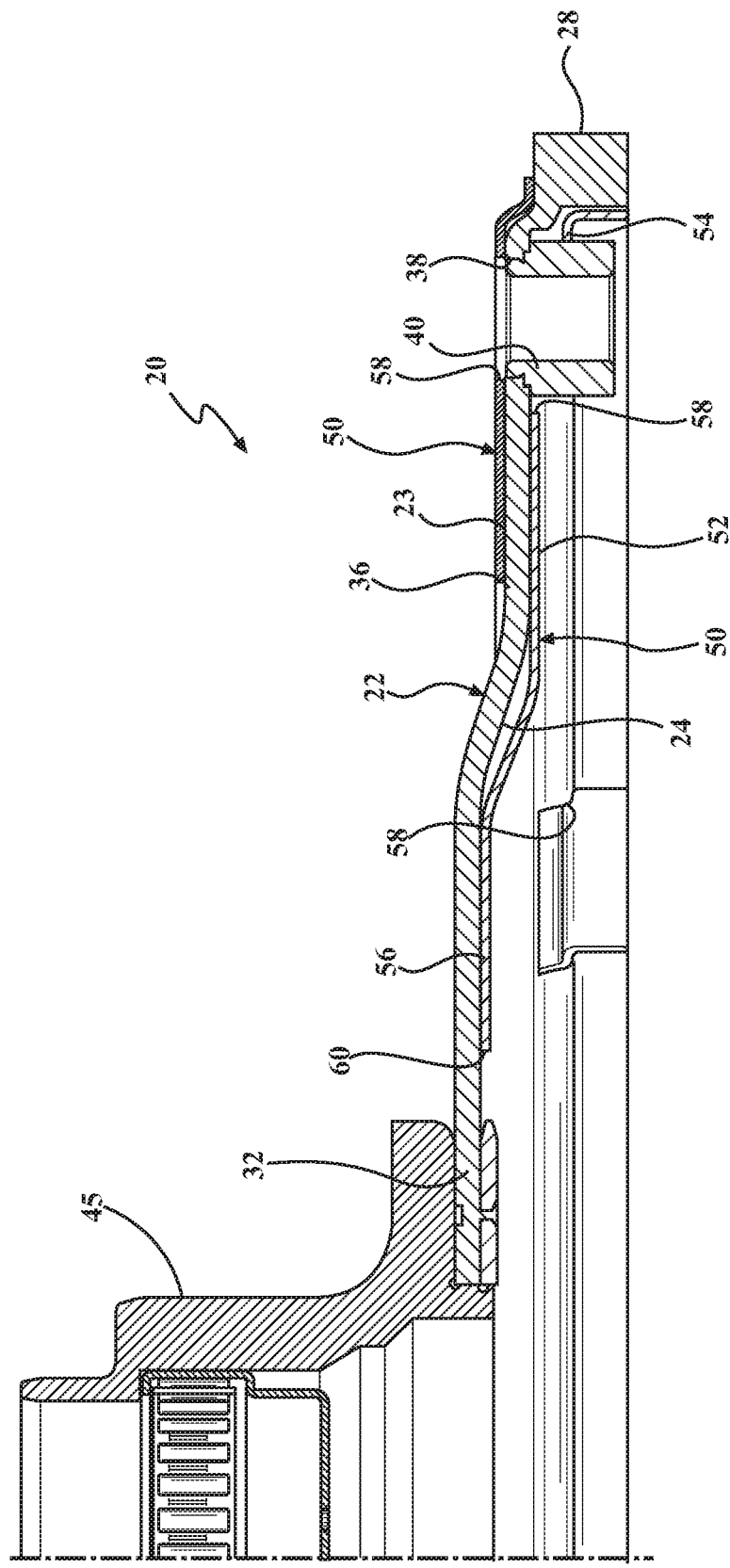
FIG. 9 is a partial side cross-sectional view of a flexplate assembly according to an aspect of the disclosure.
Figure 10:
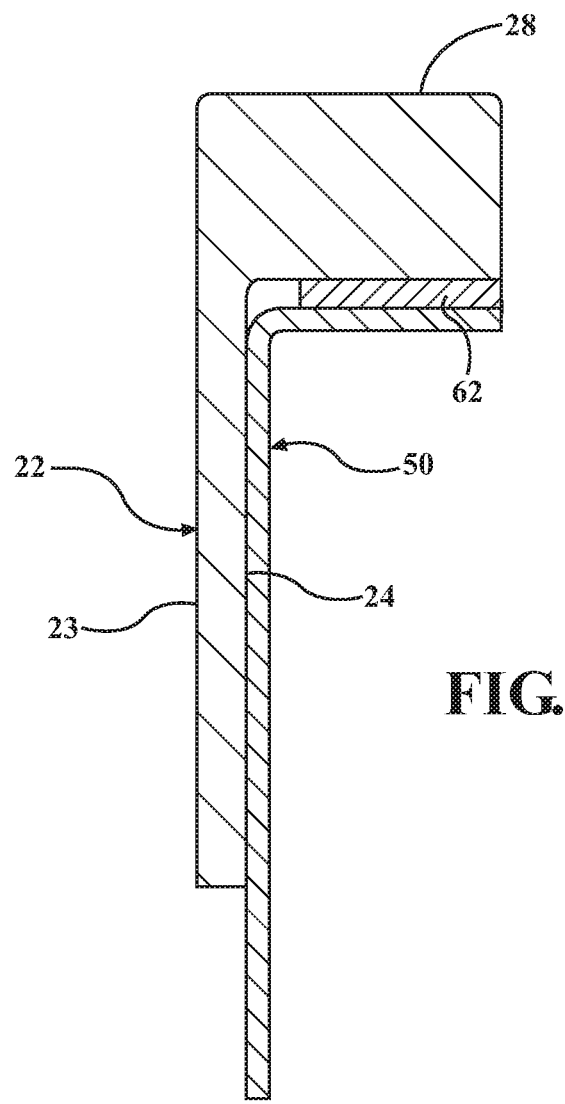
FIG. 10 is an enlarged partial cross-sectional view of a central plate and noise plate of a flexplate assembly according to an aspect of the disclosure illustrating an additional damping material.

As best illustrated in FIGS. 8A-8B, the central plate 20 has a first width $W_1$ in the radial direction, and the noise plate 50 has a second width $W_2$ in the radial direction. According to the embodiment of FIGS. 8A-8B, the second width $W_2$ of the noise plate 50 is at least one half of the first width $W_1$ to provide for increased reduction of noise and vibrations through increased conversion of friction to heat due to the increased surface area between the central plate 22 and noise plate 50, and increased mass and stiffness of the flex plate assembly 20.

According to the embodiment shown in FIGS. 8A-8B, the central plate 22 includes a first flange 51 that extends substantially perpendicularly to the axis A along the region of the outer portion 36 and terminates radially at the ring gear 26. The central plate 22 also includes a first angled segment 53 that extends radially inwardly and axially from the first flange 51, and a second flange 55 that extends substantially perpendicularly to the axis A from the first angled portion 53 along the region of the inner portion 32. Furthermore, the central plate 22 includes a first lower lip 57 that extends generally axially and radially outwardly from the first flange 51. More particularly, the first lower lip 57 includes a first axial portion 59 extending generally axially from the first flange 51, and a first radial portion 49 extending generally perpendicularly to the axis A from the first axial portion 59. The first radial portion 49 terminates radially at the ring gear 26.

As shown, segments of the noise plate 50 may be radially aligned with the first flange 51, first angled portion 53 and second flange 55 of the central plate 22. More particularly, the noise plate 50 includes a third flange 43 that extends generally perpendicularly to the axis A and underlies the first flange 51, and a second lower lip 65 that underlies the first lower lip 57 and extends generally axially and radially outwardly from the third flange 43 to a maximum deflection zone adjacent the ring teeth 28. The second lower lip 65 includes a second axial portion 67 that extends axially from the third flange 43 and underlies the first axial portion 59. A second radial portion 69 extends radially outwardly from the second axial portion 67 in generally perpendicular relationship with the second axial portion 67 and underlies the first radial portion 49. A third axial portion 71 extends axially from the second radial portion 69 in substantially perpendicular relationship with the second radial portion 69 and underlies the ring gear 26. The noise plate 50 further includes a second angled portion 73 that extends radially inwardly and axially from the third flange 43 and underlies the first angled segment 53, and a fourth flange 75 that extends generally perpendicularly to the axis A from the second angled portion 73 and underlies the second flange 55. It should also be appreciated that the term "generally" as used in relation to the angles at which the components of the aforementioned flanges 51, 55, 63, 75 and lips 57, 65 extend may include angles that are close to, but not exactly perpendicularly, axially, radially, etc. For example, "generally perpendicularly" may encompass an 88 or 89 degree angle.

It should be appreciated that the aforementioned arrangement of the flex plate assembly 20 of FIGS. 8A-8C provides for increased reduction of noise and vibrations through increased conversion of friction to heat due to the increased surface area between the central plate 22 and noise plate 50, and increased mass and stiffness of the flex plate assembly 20. Although the second width $W_2$ of the noise plate 50 of this embodiment is approximately three quarters of the first width $W_1$ of the central plate 22, it should be appreciated that other second widths $W_2$ could be utilized, however, employing a second width $W_2$ that is at least one half of the first width $W_1$ provides increased reduction of noise and vibrations and increased mass and stiffness of the flex plate assembly 20 as explained above.

Figure 2:
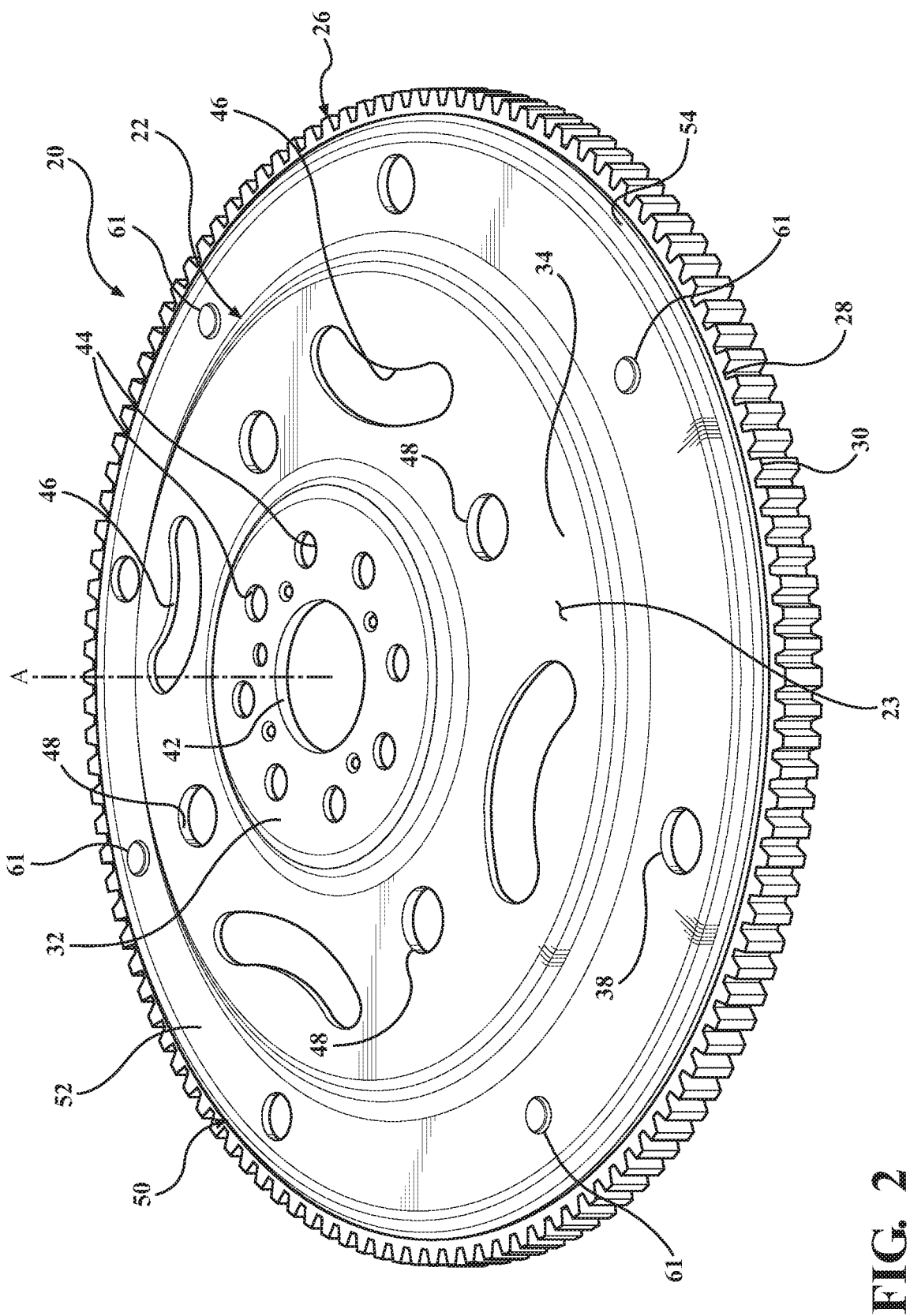
FIG. 2 is a perspective view of a flexplate assembly illustrating a central plate, a ring gear, and a noise plate according to an aspect of the disclosure.

The noise plate 50 may be attached to the central plate 22 using various plate fasteners 61. According to an aspect, the plate fasteners 61 are a plurality of clinched areas 61 (e.g. Tog-L-Loc®) spaced from one another and disposed circumferentially about the outer portion 36 of the central plate 22, as best shown in FIGS. 2, 8A and 8C. It should be understood that the plate fasteners 61 may alternatively comprise other fasteners such as, but not limited to epoxy, spot welding, rivets, or bolts. According to an aspect, the noise plate 50 may also be snap fit to the central plate 22. According to another aspect, the noise plate 50 may be partially and peripherally joined to the central plate 22 and/or ring gear 26.

Figure 11:
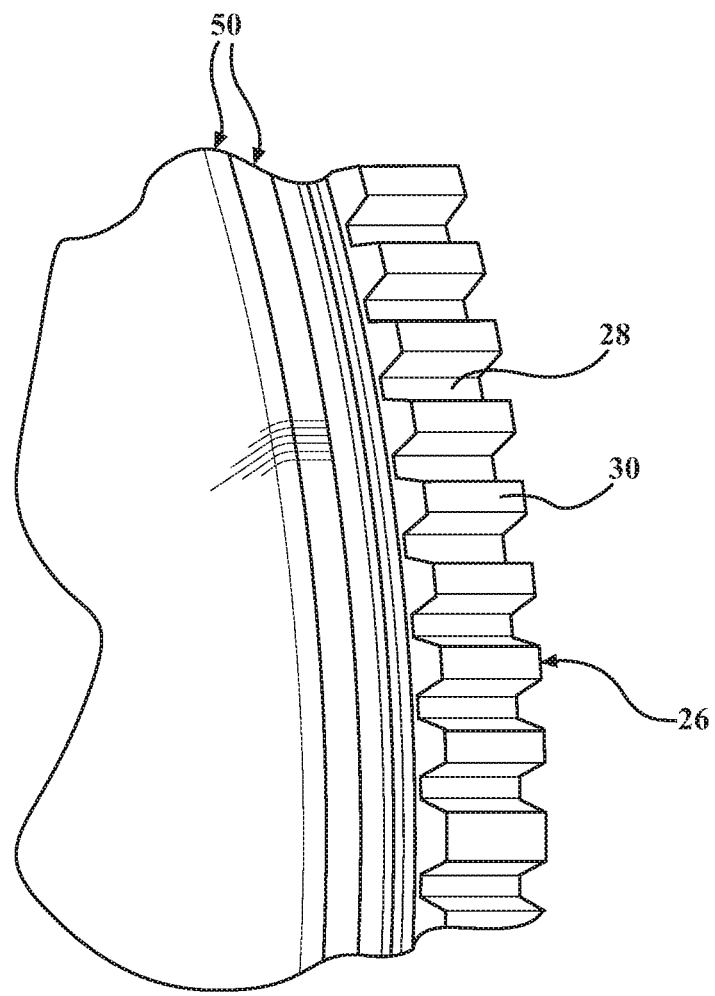
FIG. 11 is an enlarged partial perspective view of a flexplate assembly according to an aspect of the disclosure illustrating a pair of noise plates.

According to an aspect of the disclosure, one noise plate 50 may also be disposed adjacent to the top surface 23 of the central plate 22 and another noise plate 50 may be disposed adjacent to the bottom surface 24 as best shown in FIGS. 9A-9C. Furthermore, as best presented in FIG. 10, an additional damping material 62, such as but not limited to an organic polymeric material, could be disposed between the noise plate 50 and central plate 22 and/or ring gear 26 to provide for additional noise and vibration reduction. According to another aspect, the flexplate assembly 20 includes a plurality of noise plates 50 both disposed adjacent to the top surface 23 of the central plate 22, as shown in FIG. 11. It should be appreciated that the additional damping material 62 may also be disposed between each of the plurality of noise plates 50 which are disposed adjacent to the top surface 23 of the central plate 22.

Figure 12A:
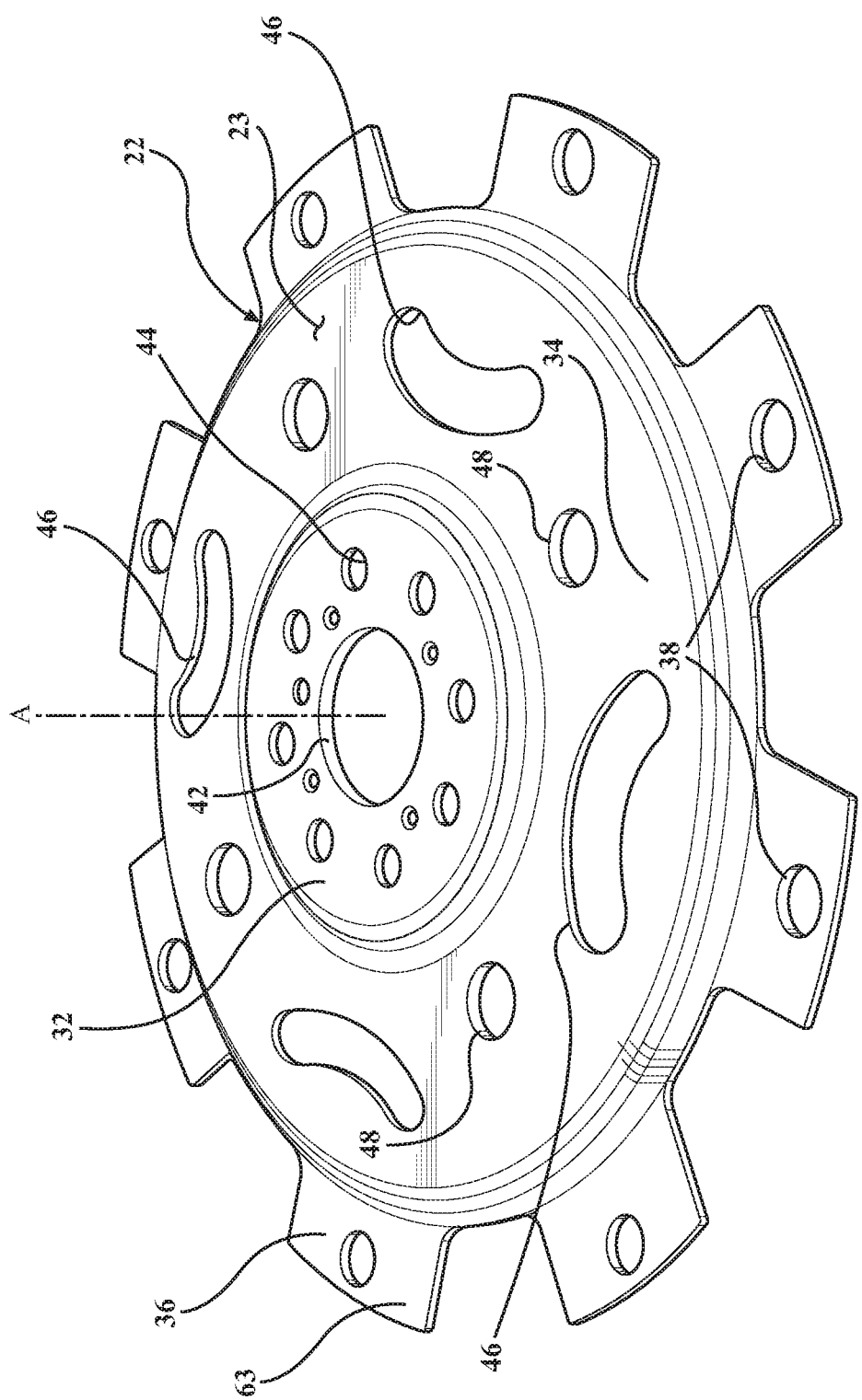
FIG. 12A is a perspective view of a central plate of a flexplate assembly according to an aspect of the disclosure.
Figure 12B:
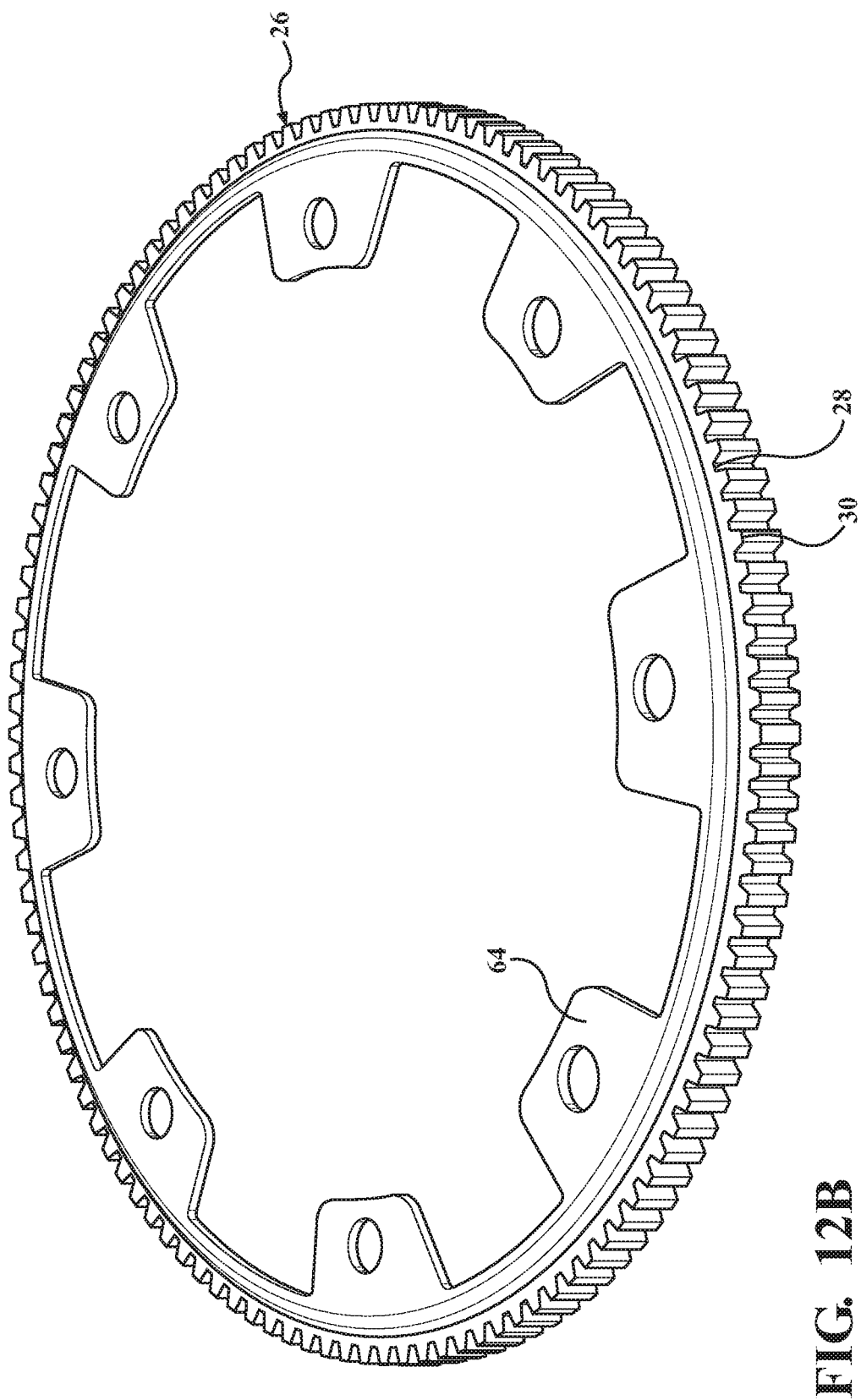
FIG. 12B is a perspective view of a ring gear of a flexplate assembly according to an aspect of the disclosure.
Figure 12C:
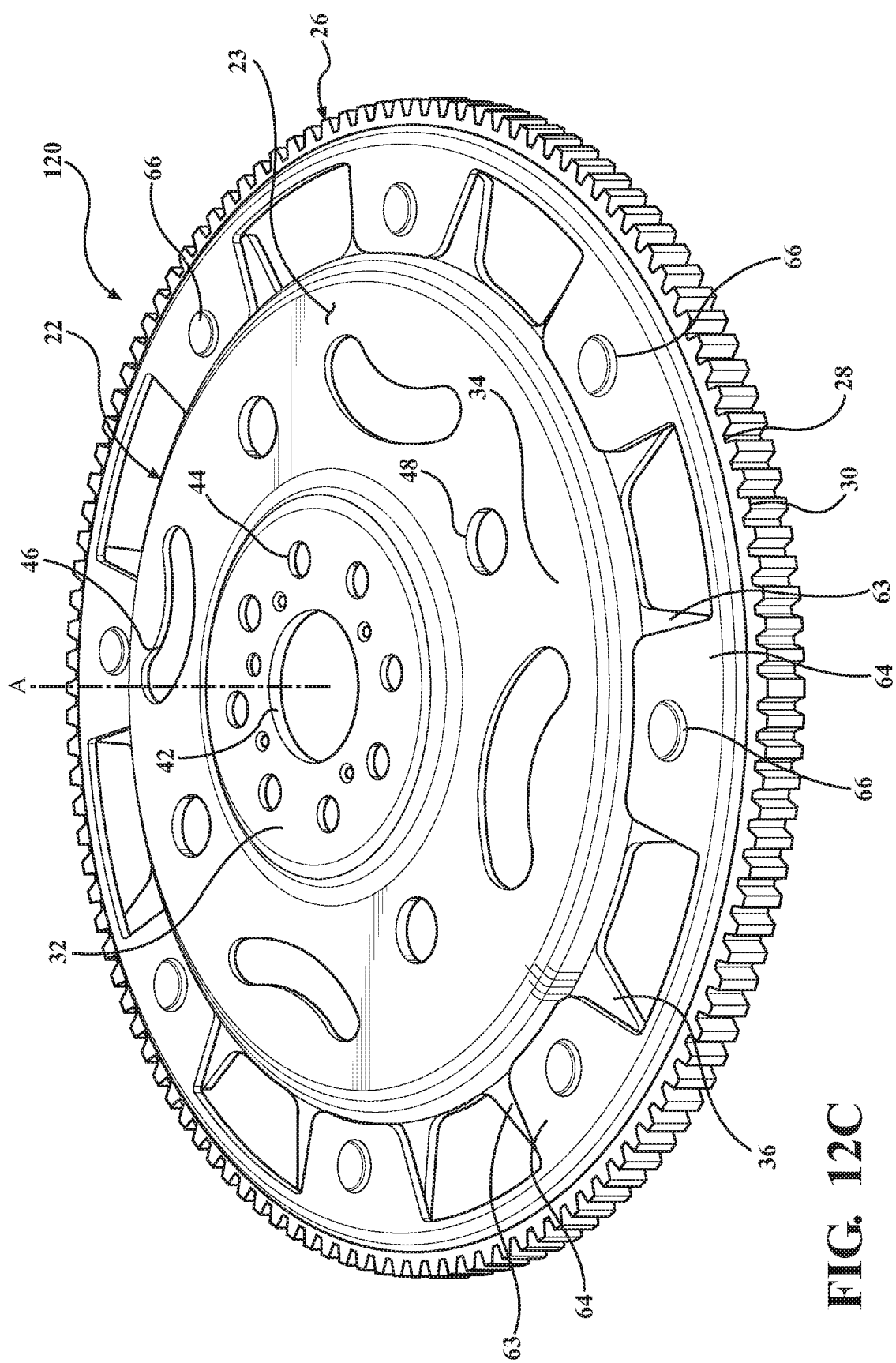
FIG. 12C is a perspective view of a flexplate assembly according to an aspect of the disclosure.

In an alternate embodiment of the disclosure as best presented in FIGS. 12A-12C, the outer portion 36 of the central plate 22 is defined by a plurality of first lugs 63 (FIG. 12A) that extend radially from the intermediate portion 34 of the central plate 22 and are circumferentially and evenly spaced from one another about the central plate 22. Further, the ring gear 26 presents a plurality of second lugs 64 (FIG. 12B) that extend radially inwardly from the outer circumference 28 and are circumferentially and evenly spaced from one another about the ring gear 26. As best shown in FIG. 12C, the central plate 22 and ring gear 26 may be attached together. Specifically, each of the first lugs 63 of the central plate 22 overlies one of the second lugs 64 of the ring gear 26 to coaxially align the central plate 22 and ring gear 26. A lug fastener 66 connects each of the respective pairs of first and second lugs 63, 64 to secure the central plate 22 and ring gear 26 to one another. In the disclosed embodiment, the lug fasteners 66 are rivets, however, it should be appreciated that other lug fasteners 66 could be used such as, but not limited to bolts, welding, epoxy, or clinching. According to an aspect of the disclosure, the noise plate 50 could be connected with the central plate 22 and/or ring gear 26 in the same ways as for the other disclosed embodiments to form the flexplate assembly 120. It should be appreciated that in this embodiment, to reduce noise and minimize materials used, the central plate 22 and the ring gear 26 are separated from an original one-piece flexplate. These pieces 22, 26 are then reassembled by rotationally displacing them from one another and refastening them (riveting, etc.).

Figure 13A:
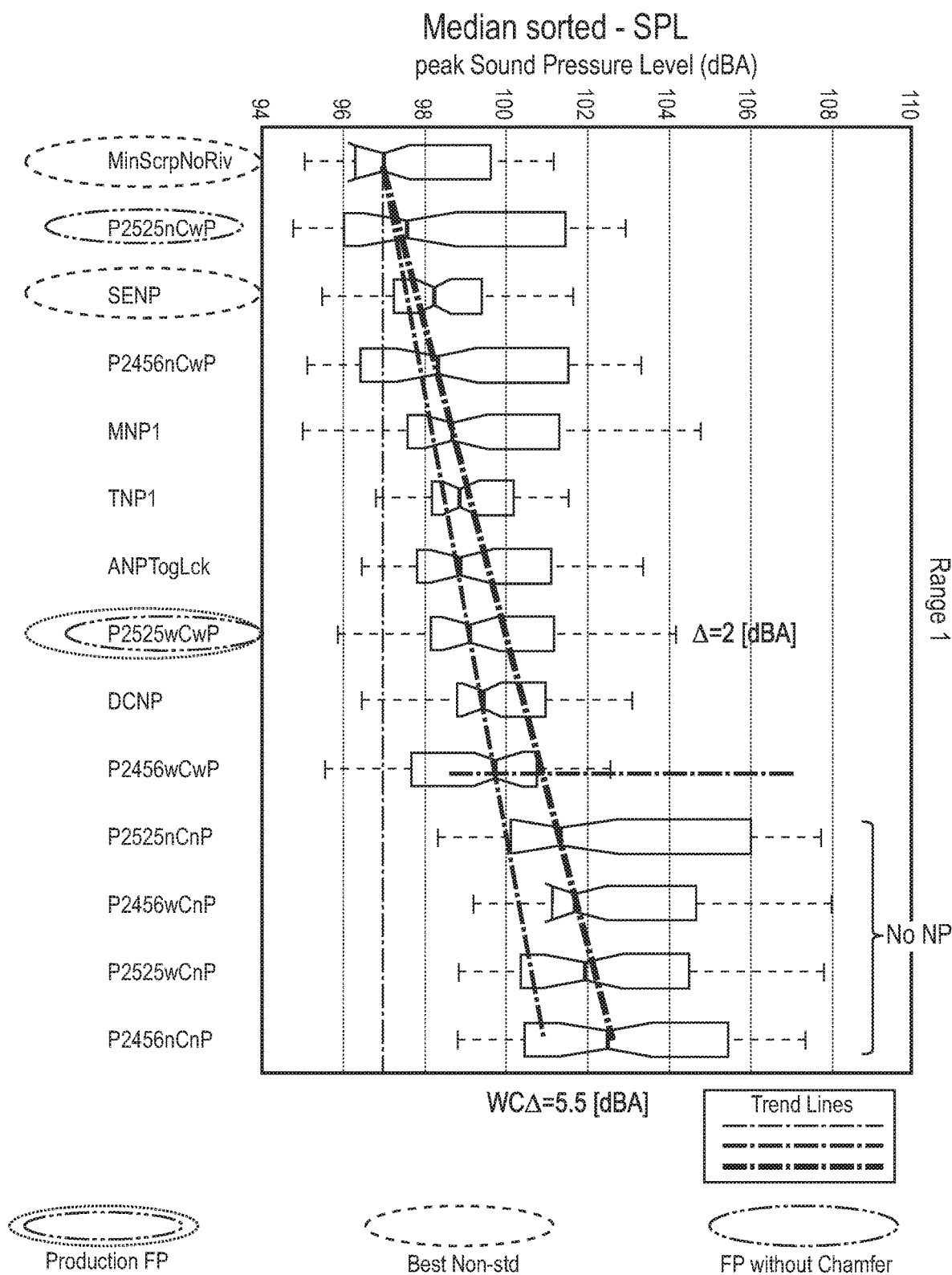
FIGS. 13A-13B are graphs illustrating testing results of flexplate assemblies according to aspects of the disclosure.
Figure 13B:
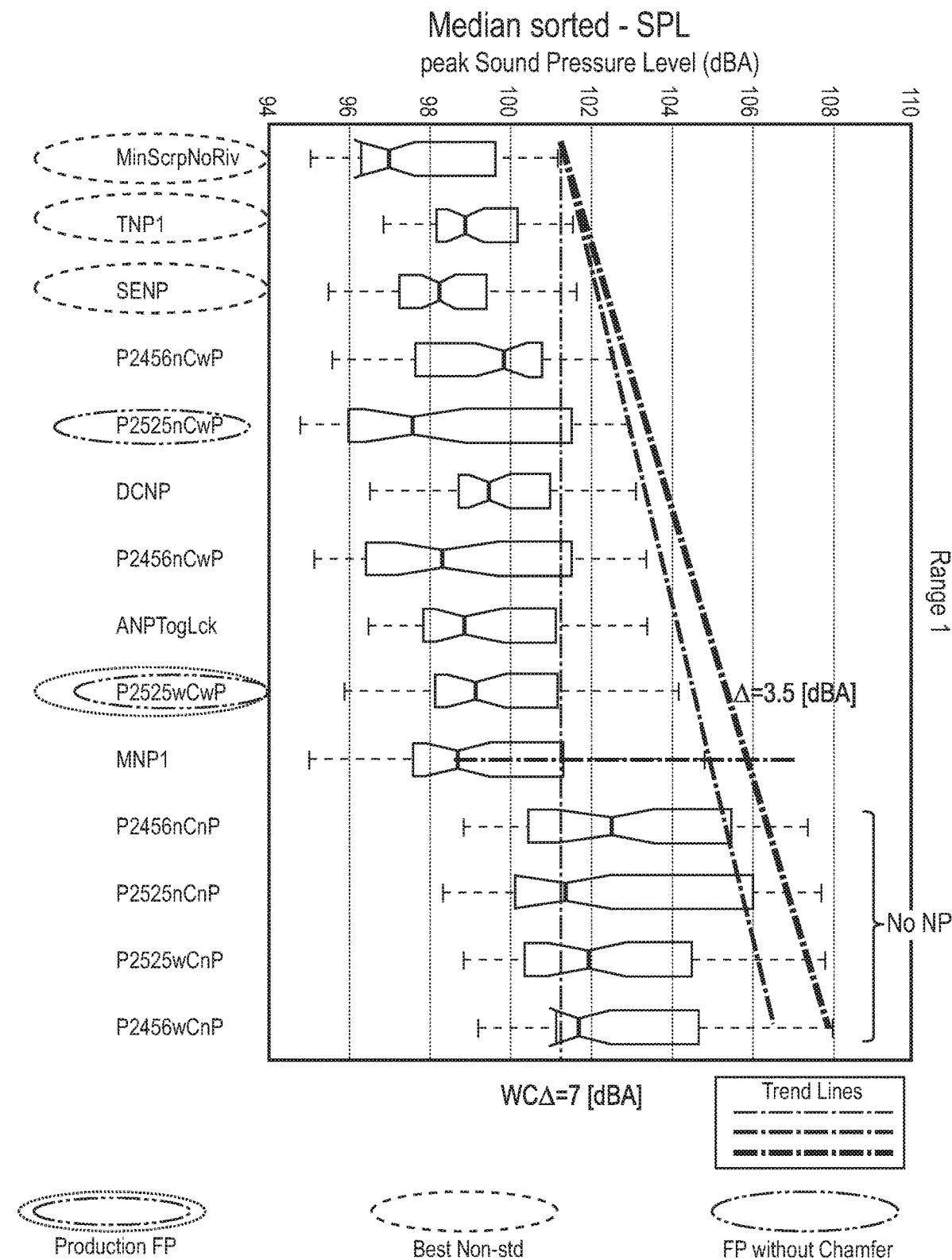
Figure 14:
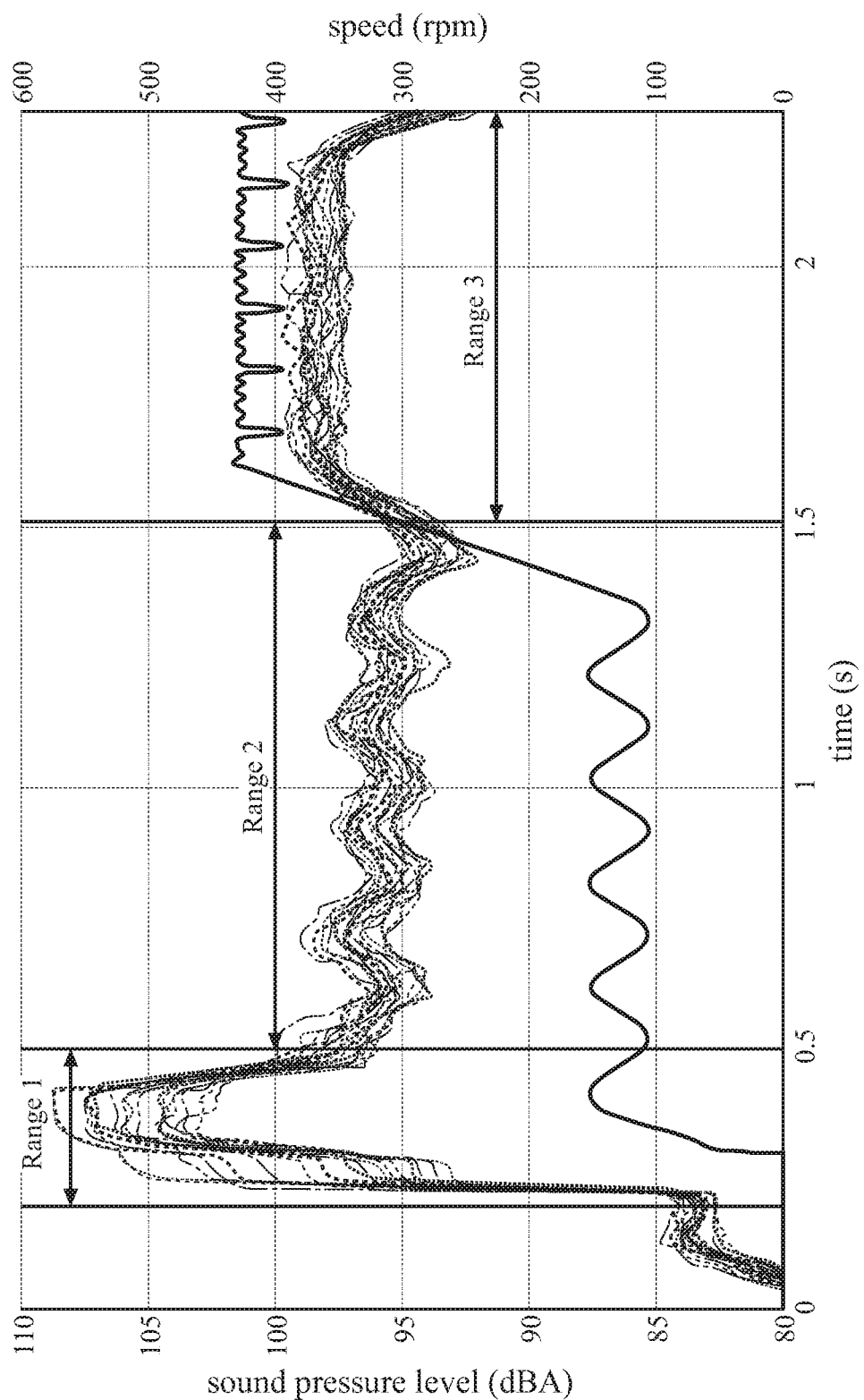
FIG. 14 is a graph illustrating noise emitted from a flexplate assembly according to an aspect of the disclosure.

The flexplate assemblies 20, 120 disclosed herein reduce noise as illustrated in FIGS. 13A and 13B which illustrate testing results of flex plate assemblies 20, 120 described as compared to other designs including those that do not utilize noise plates 50 (indicated as "No NP" in FIGS. 13A and 13B). In order to obtain such testing results, the sound pressure levels, in decibels are recorded during engagement of the gear teeth of the pinion gear with the ring teeth 30 of the ring gear 26 or computed in a simulation. As illustrated in FIG. 14, the highest sound pressure levels are typically during initial engagement of the gear teeth of the pinion gear with the ring teeth 30 of the ring gear 26 (indicated as "Range 1"), while lower noise levels may be expected while the starter drives continuously (indicated as "Range 2") and once the engine is running ("indicated as "Range 3"). The flexplate assembly 120 disclosed also advantageously provides for a design that uses fewer materials and reduces waste during manufacturing in comparison to previous techniques whereby the central plate 22 and/or ring gear 26 and noise plate 50 are blanked (e.g. stamped) separately. However, it should be appreciated that the central plate 22, ring gear 26, and noise plate 50 may alternatively be blanked or constructed separately.

Figure 15:
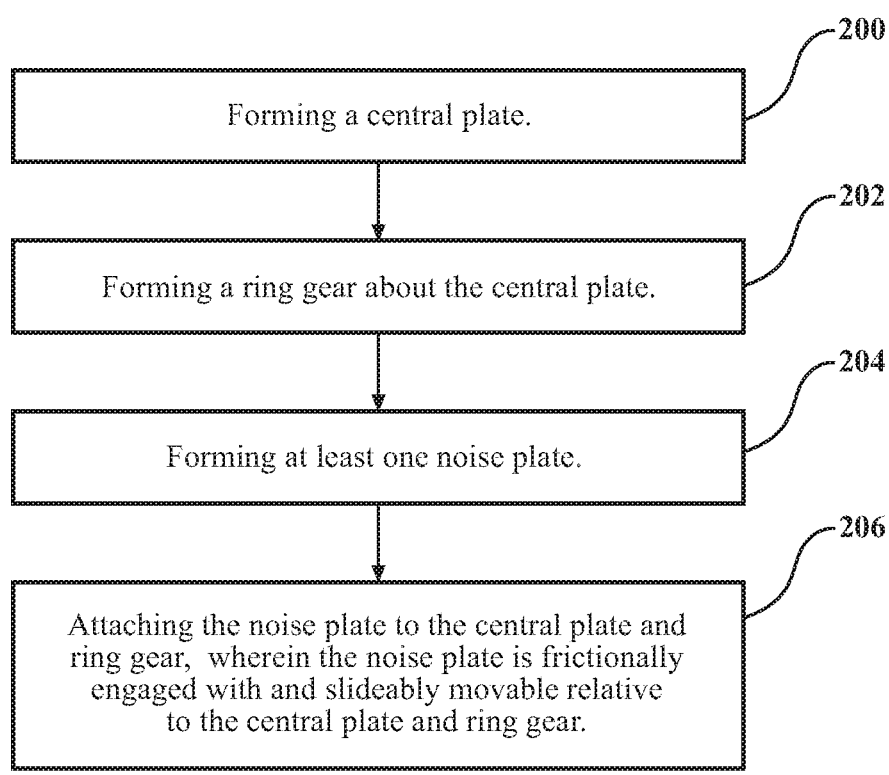
FIG. 15 is a flow chart illustrating the steps of constructing a flexplate assembly according to an aspect of the disclosure.

As illustrated by a flow chart in FIG. 15, a method of constructing a method of constructing a flexplate assembly 20, 120 is also disclosed. The method includes the step of 200 forming a central plate 22. The method proceeds by 202 forming a ring gear 26 about the central plate 22. As discussed above, the central plate 22 and ring gear 26 may originally begin as a one-piece flexplate which is separated and refastened. Consequently, the step of forming the ring gear 26 about the central plate 22 can include the steps of forming a ring gear 26 about the central plate 22, cutting the central plate 22 to form a plurality of first lugs 63 extending radially outwardly from the central plate 22 and a plurality of second lugs 64 extending radially inwardly from the ring gear 26, rotationally displacing the ring gear 26 and the central plate 22 to align the first lugs 63 and the second lugs 64, and securing the ring gear 26 to the central plate 22 at the lugs 63, 64. It should be understood that the ring gear 26 could be formed about the central plate 22 using other manufacturing techniques such as, but not limited to welding or casting. The next step of the method is 204 forming at least one noise plate 50. The noise plate 50 may be formed using any manufacturing technique such as, but not limited to stamping, molding, or casting. The method concludes with the step of 206 attaching the noise plate 50 to the central plate 22 and ring gear 26, with the noise plate 50 underlying the central plate 22, and wherein the noise plate 50 is frictionally engaged with and slideably moveable relative to the central plate 22 and ring gear 26. As disclosed above, the noise plate 50 can attached to the central plate 22 and/or ring gear 26 using various plate fasteners 61. Therefore, the method may include steps such as, but not limited to applying epoxy, welding, riveting, or bolting. According to an aspect, the step of 206 attaching the noise plate 50 to the central plate 22 and ring gear 26 is further defined as clinching the central plate 22 and noise plate 50 to form plate fasteners 61 (e.g. Tog-L-Loc®) spaced from one another and disposed circumferentially about the central plate 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Obviously, many modifications and variations of the present invention are possible in light of the above teachings and may be practiced otherwise than as specifically described while within the scope of the appended claims.

What is claimed is:

1. A flexplate assembly comprising;
   a central plate having a general disc shape disposed about and extending radially from an axis, said central plate having a first radial width,
   a ring gear annularly secured about said central plate and presenting an outer circumference defining a plurality of ring teeth extending therefrom, and
   at least one noise plate disposed adjacent to said central plate and extending circumferentially about said axis for reducing vibrations and noise from said flexplate assembly,
   wherein said noise plate has a second radial width being at least one half of said first radial width of said central plate, wherein said central plate defines a plurality of slots, and wherein said ring gear defines a plurality of apertures in axial alignment with said slots.

2. A flexplate assembly as in claim 1, wherein said central plate has a top surface and a bottom surface, and wherein said top surface is configured to connect to a hub for a driveshaft.

3. A flexplate assembly as in claim 2, wherein said at least one noise plate underlies said bottom surface.

4. A flexplate assembly as in claim 2, wherein said at least one noise plate overlies said top surface.

5. A flexplate assembly as in claim 2, wherein said at least one noise plate includes a first noise plate underlying said bottom surface and a second noise plate overlying said top surface.

6. A flexplate assembly as in claim 1 wherein said central plate includes a first flange extending generally perpendicularly to said axis and terminating at said ring gear, a first angled portion extending generally radially inwardly and axially from said first flange, and a second flange extending generally perpendicularly to said axis from said first angled portion.

7. A flexplate assembly as in claim 6 wherein said at least one noise plate is at least partially radially aligned with said first flange and said first angled portion of said central plate.

8. A flexplate assembly as in claim 6 wherein said central plate further includes a first lower lip extending generally axially and radially outwardly from said first flange, and wherein said first lower lip includes a first axial portion extending generally axially from said first flange and a first radial portion extending generally perpendicularly to said axis from said first axial portion and terminating at said ring gear.

9. A flexplate assembly as in claim 8, wherein said noise plate includes a third flange extending generally perpendicularly to said axis and underlying said first flange, and a second lower lip underlying said first lower lip and extending generally axially and radially outwardly from said third flange to a maximum deflection zone adjacent said ring teeth of said ring gear.

10. A flexplate assembly as in claim 9 wherein said second lower lip of said noise plate includes a second axial portion extending generally axially from said third flange and underlying said first axial portion, a second radial portion extending radially outwardly from said second axial portion in generally perpendicular relationship with said first axial portion and underlying said first radial portion, and a third axial portion extending axially from said second radial portion in generally perpendicular relationship with said second radial portion and underlying said ring gear.

11. A flexplate assembly as in claim 10, wherein said noise plate further includes a second angled portion extending radially inwardly and axially from said third flange and underlying said first angled segment, and a fourth flange extending generally perpendicularly to said axis from said second angled portion and underlying said second flange.

12. A flexplate assembly as in claim 11, wherein second flange terminates at a central opening of said central plate, and wherein said fourth flange terminates at a middle opening of said noise plate.

13. A flexplate assembly as claimed in claim 1 further including a plurality of plate fasteners connecting said noise plate to said central plate.

14. A flexplate assembly as in claim 13, wherein said plurality of plate fasteners are spaced from one another and disposed circumferentially about said axis.

15. A flexplate assembly as in claim 13, wherein said plurality of plate fasteners each comprise a clinched area.

16. A flexplate assembly as in claim 13, wherein said plate fasteners include at least one of the following: epoxy, weld, rivet, screw, or bolt.

17. A flexplate assembly as in claim 1, wherein said noise plate further includes tabs extending from the noise plate toward at least one of said central plate and said ring gear to provide spring-like compressive forces for increased friction to heat conversion and to provide for additional impact cushioning and compliance.

18. A flexplate assembly adapted to be connected to a shaft, comprising:
   a central plate having a first surface and a second surface and defining a first flange terminating in a ring gear, a second flange, and an angled intermediate segment interconnecting the first and second flanges;
   a hub secured to the first surface of the central plate on the second flange and adapted for driven connection to the shaft; and a noise plate disposed adjacent to and frictionally engaging at least one of the first and second flanges of the central plate.

wherein the noise plate has a noise plate radial dimension that is at least one-half of a central plate radial dimension of the central plate.

19. The flexplate assembly of claim 18, wherein the noise plate is aligned adjacent to one of the first and second surfaces of the central plate.

20. The flexplate assembly of claim 18, wherein the first flange of the central plate defines an annular lip from which gear teeth of the ring gear extend, and wherein the noise plate includes a first segment aligned with the first flange, a second segment aligned with the second flange, a third segment aligned with the angled intermediate segment and interconnecting the first and second segments, and an annular rim segment extending from the first segment and aligned with the annular lip.

21. A flexplate assembly comprising:
a central plate having a general disc shape disposed about and extending radially from an axis, said central plate defining a top surface and a bottom surface with said top surface configured to be connected to a hub of a driveshaft, and said central plate having a first radial width;
a ring gear annularly secured about said central plate and presenting an outer circumference defining a plurality of ring gear teeth extending therefrom; and
at least one noise plate disposed adjacent to said central plate and extending circumferentially about said axis for reducing vibration and noise from said flexplate assembly,
wherein said at least one noise plate includes a first noise plate underlying said bottom surface of said central plate and a second noise plate overlying said top surface of said central plate, and wherein said first and second noise plates each have a second radial width being at least one half of said first radial width of said central plate.

22. A flexplate assembly comprising:
a central plate having a general disc shape disposed about and extending radially from an axis, said central plate including a first flange extending transversely to said axis and terminating at said ring gear, a first angled portion extending radially inwardly and axially from said first flange, and a second flange extending transversely to said axis from said first angled portion, said central plate having a first radial width;
a ring gear secured about said central axis and presenting an outer circumference defining a plurality of ring gear teeth extending therefrom; and
a noise plate disposed adjacent to said central plate and extending circumferentially about said axis for reducing vibration and noise from said flexplate assembly,
wherein said noise plate has a second radial width being at least one half of said first radial width of said central plate, wherein said central plate further includes a first lower lip extending axially and radially outwardly form said first flange, and wherein said first lower lip includes a first axial portion extending axially away from said first flange and a first radial portion extending transversely to said axis from said first axial portion and terminating at said ring gear.

* * * * *